US006452353B1

(12) United States Patent
Calamatas

(10) Patent No.: US 6,452,353 B1
(45) **Date of Patent: *Sep. 17, 2002**

(54) SYSTEM FOR DETECTION OF OBSTRUCTIONS IN A MOTORIZED DOOR SYSTEM

(75) Inventor: Philip J. Calamatas, Fabreville la Val (CA)

(73) Assignee: Westinghouse Air Brake, Wilmerding, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/448,999

(22) Filed: Nov. 24, 1999

Related U.S. Application Data

(60) Provisional application No. 60/109,951, filed on Nov. 25, 1998.

(51) Int. Cl.[7] .................................................. H02P 7/00

(52) U.S. Cl. ....................... 318/466; 318/256; 318/257; 318/264; 318/265; 318/268; 318/466; 318/467; 318/468; 49/25; 49/26; 49/27; 49/28; 49/29; 187/265; 187/293; 187/316

(58) Field of Search ................................ 318/256, 257, 318/264, 265, 268, 293, 466, 467, 468; 49/26, 27, 28, 29; 187/316, 293, 265

(56) References Cited

U.S. PATENT DOCUMENTS

| | | | | | |
|---|---|---|---|---|---|
| 4,206,491 | A | * | 6/1980 | Ligman et al. | 361/172 |
| 4,367,810 | A | * | 1/1983 | Doane et al. | 187/29 R |
| 5,378,861 | A | * | 1/1995 | Barten et al. | 187/316 |
| 5,404,418 | A | * | 4/1995 | Nagano | 388/806 |
| 5,422,551 | A | * | 6/1995 | Takeda et al. | 318/265 |
| 5,483,133 | A | * | 1/1996 | Takebe et al. | 318/466 |
| 5,530,329 | A | * | 6/1996 | Shigematsu et al. | 318/469 |
| 5,539,290 | A | * | 7/1996 | Lu et al. | 318/565 |
| 5,689,160 | A | * | 11/1997 | Shigematsu et al. | 318/281 |
| 5,757,156 | A | * | 5/1998 | Sasajima et al. | 318/456 |
| 5,804,779 | A | * | 9/1998 | Fargo | 187/316 |
| 5,892,340 | A | * | 4/1999 | Sasajima et al. | 318/293 |
| 5,982,125 | A | * | 11/1999 | Ranaudo et al. | 318/466 |
| 6,100,658 | A | * | 8/2000 | Kume et al. | 318/286 |

* cited by examiner

*Primary Examiner*—Robert E. Nappi
*Assistant Examiner*—Tyrone Smith
(74) *Attorney, Agent, or Firm*—James Ray & Associates

(57) ABSTRACT

Method of detecting obstructions encountered by a motorized door. The method includes providing a signal processor with one or more signals indicative of a predetermined door trajectory profile for at least a segment of a stroke of the door, the door trajectory profile providing an ideal speed and/or position versus an elapsed time since a beginning of the segment of the stroke. A door position signal from a position encoder for the door is received into the signal processor. The method includes generating one or more signals indicative of the velocity and/or position of the door from the door position signal and generating a trajectory discrepancy signal based on the velocity and/or position in relation to the ideal speed and/or position. A motor control signal is generated based on the trajectory discrepancy signal and the motor control signal is connected to motor control circuits connected to drive the motor for the door. The method further includes performing one or more tests on either the trajectory discrepancy, the velocity of the door or the position of the door to determine whether the door has encountered an obstruction, in which case an obstruction detection signal is generated. The obstruction detection signal is for stopping the door.

14 Claims, 8 Drawing Sheets

SYSTEM FOR DETECTION OF OBSTRUCTIONS IN A MOTORIZED DOOR SYSTEM

CROSS-REFERENCE TO RELATED APPLICATIONS

The invention described in this patent application is closely related to the following copending patent applications: TRANSIT VEHICLE DOOR, Ser. No. 09/099,260, filed Jun. 18, 1998; DYNAMIC BRAKE FOR POWER DOOR, Ser. No. 09/200,497, filed Nov. 25, 1998; ENCODER TEST APPARATUS AND METHOD, Ser. No. 09/200,497, filed Sep. 23, 1999; and provisional patent application: INTELLIGENT DOOR CONTROL UNIT, Serial No. 60/109,951, filed Nov. 25, 1998. Additionally, this application is related to patent applications: DOOR CONTROL SYSTEM and TRAPPED OBJECT RELEASE SYSTEM FOR A TRANSIT VEHICLE DOOR, being filed concurrently herewith. The teachings of these referenced applications are incorporated into the present application by reference thereto.

FIELD OF THE INVENTION

The present invention relates, in general, to control systems for powered doors and, more particularly, the instant invention relates to a powered door control system for a passenger transit type vehicle.

BACKGROUND OF THE INVENTION

Motor driven transit vehicle door systems require a system for detecting obstructions to protect a passenger who may be in the path of a door which is closing or opening as would be the case with outside sliding door(s). This requirement must be seriously considered because transit vehicle doors may be quite massive and such doors are generally moved quickly between the open and closed positions. Forces required for rapid movement of massive doors are generally sufficient to cause injury to a passenger. This would be the case, particularly, on the closing cycle when a passenger may be caught by the closing door(s).

Prior to the development of the present invention, one method which has been employed is to place leading edge sensors in the seals adjacent the edge of a door which closes against a stop or against another door. Such leading edge sensors are generally unreliable, in part because floating cables must be connected to the moving door panels. Any failure of the edge sensor, or the cable connecting it to the control system for the door, may result in a door which attempts to continue a closing stroke, even after contacting a passenger.

Sensing the torque of the motor by the current drawn by the motor is another previously employed method. This method has been found to be extremely inaccurate because the current drawn by the motor can vary widely due to aging and to temperature. As is generally well known, aging reduces the strength of the field magnet (generally a permanent magnet). Additionally, the normal friction which the motor must overcome due to the door suspension and the drive mechanism may also vary through a wide range. Furthermore, this method can only detect a very substantial impact.

SUMMARY OF THE INVENTION

In one aspect, the present invention is a method of detecting obstructions encountered by a motorized door. The method includes providing a signal processor with one or more signals indicative of a predetermined door speed and/or position profile for at least a segment of a stroke of the door. The profile providing an ideal speed and/or position versus an elapsed time since the beginning of the segment of the stroke. A door position signal communicated from a position encoder for the door is received into the signal processor. The method includes generating one or more signals indicative of either a velocity (or position change per unit time) of the door from the door position signal and generating a trajectory discrepancy signal indicative of an error between the velocity and/or position of the door and the ideal speed and/or position. A motor control signal is generated based on the trajectory discrepancy signal and the motor control signal is connected to the motor for the door. The method further includes performing one or more tests on either the trajectory discrepancy, the actual velocity and/or position of the door versus the ideal velocity and/or position to determine whether the door has encountered an obstruction. In that case an obstruction detection signal is generated. The obstruction detection signal is for communication to a brake to stop the door(s).

In another aspect, the invention is an apparatus for detecting obstructions encountered by motorized door(s). The invention includes means for providing a signal processor with one or more signals indicative of a predetermined door trajectory profile for at least a segment of a stroke of the door. Such predetermined door trajectory profile providing an ideal speed versus an elapsed time since a beginning of the segment of the stroke. The apparatus includes means for receiving into the signal processor a door position signal from a position encoder for the door(s) and provision for generating one or more drive signals indicative of the velocity of the door from the door position signals. The signal processor includes means for generating a trajectory discrepancy signal indicative of a either a velocity and/or position discrepancy between the desired trajectory of the door and the ideal trajectory. It has means for generating a motor control signal based on the trajectory discrepancy signal. The motor control signal is connected to a power amplifier that drives the motor for the door(s). The signal processor also has means for performing one or more tests on the trajectory profile to determine whether the door has encountered an obstruction and it includes means for generating an obstruction detection signal from the one or more test. The obstruction detection signal is for stopping the door.

OBJECTS OF THE INVENTION

It is, therefore, one of the primary objects of the present invention to provide an obstruction detection system and method for motorized door(s) which does not require the use of leading edge sensor(s).

Another object of the present invention is to provide an obstruction detection system for a motorized door which does not depend on a measurement of motor torque.

Still another object of the present invention is to provide an obstruction detection system for a motorized door which does not depend on motor current.

Yet another object of the present invention is to provide an obstruction detection system for a CPU controlled motorized door which does not place a significant workload on the CPU.

A further object of the present invention is to provide an obstruction detection system for a motorized door which has fail safe features.

It is an additional object of the present invention to provide an obstruction detection system for a motorized door which operates quickly upon encountering an obstruction.

Still yet another object of the present invention is to provide an obstruction detection system for a motorized door which can distinguish between friction and an obstruction.

A still further object of the present invention is to provide an obstruction detection system for motorized door(s) in which failure of the obstruction detection system prevents movement of the door(s).

Another object of the present invention is to provide a procedural obstruction detection system for motorized door (s) wherein obstruction detection and movement are controlled by the same components.

Yet another object of the present invention is to provide an obstruction detection system for a motorized door which may be used for either a door system employing a single door panel or a biparting door system having two door panels.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
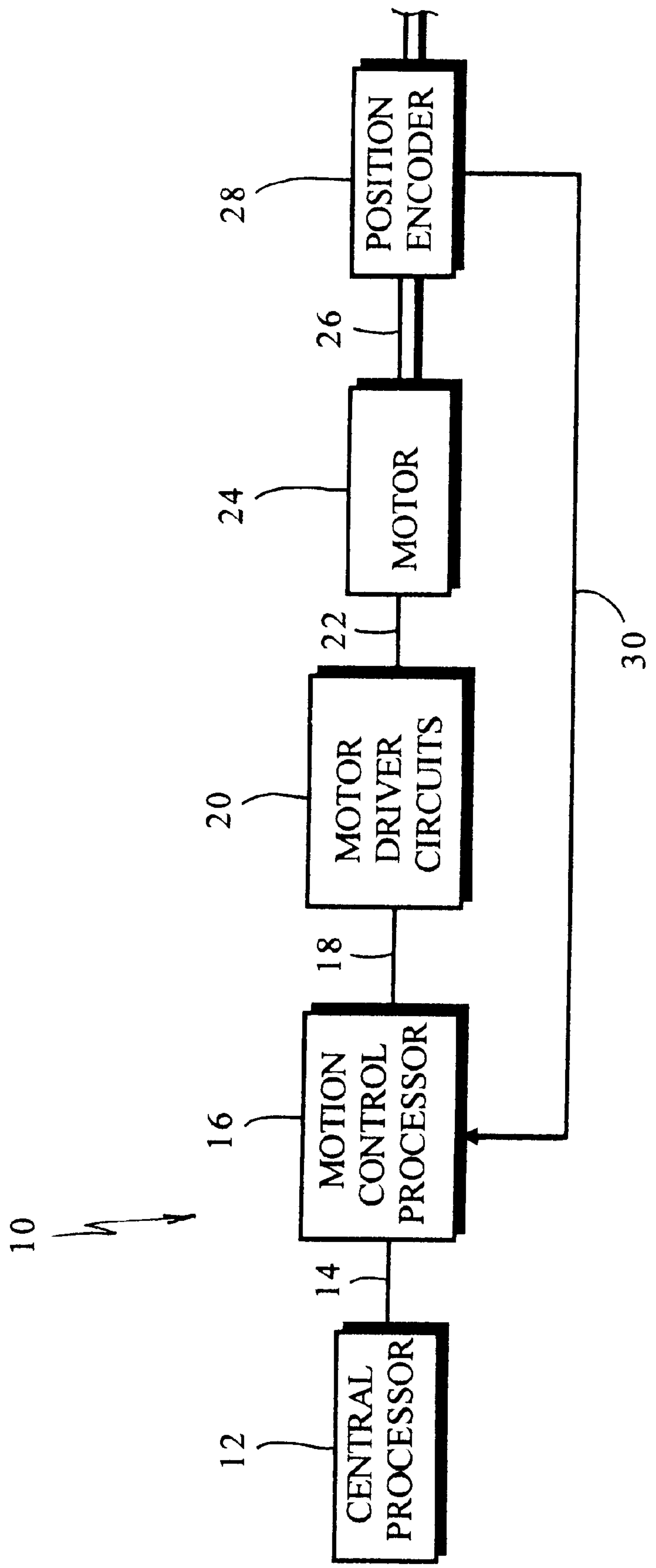
FIG. 1 is a schematic illustration of a presently preferred embodiment of the invention.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures for the sake of clarity and understanding of the invention.

Attention is now directed to FIG. 1 which shows an apparatus, generally designated 10, which controls the door (not shown) and which detects obstructions. Apparatus 10 includes a central processor 12 having a bus signal connection 14 to a signal processor, preferably, digital signal processor (DSP) 16. DSP 16 includes a signal connection 18 to motor driver circuits 20 which have a connection 22 to motor 24. A person skilled in the art will recognize that motor driver circuits 20 may, for example, include an H-bridge amplifier. Motor 24 has an output power rotor 26 and a rotary position encoder 28 which determines the rotary position of output power rotor 26 and hence defines the position of the door.

Additional detail regarding the motor driver circuits 20 is supplied by the previously filed application: DYNAMIC BRAKE FOR POWER DOOR, Ser. No. 09/200,497. Additional detail regarding the encoder is supplied by the previously filed application: ENCODER TEST APPARATUS AND METHOD, Ser. No. 09/200,497.

Figure 2:
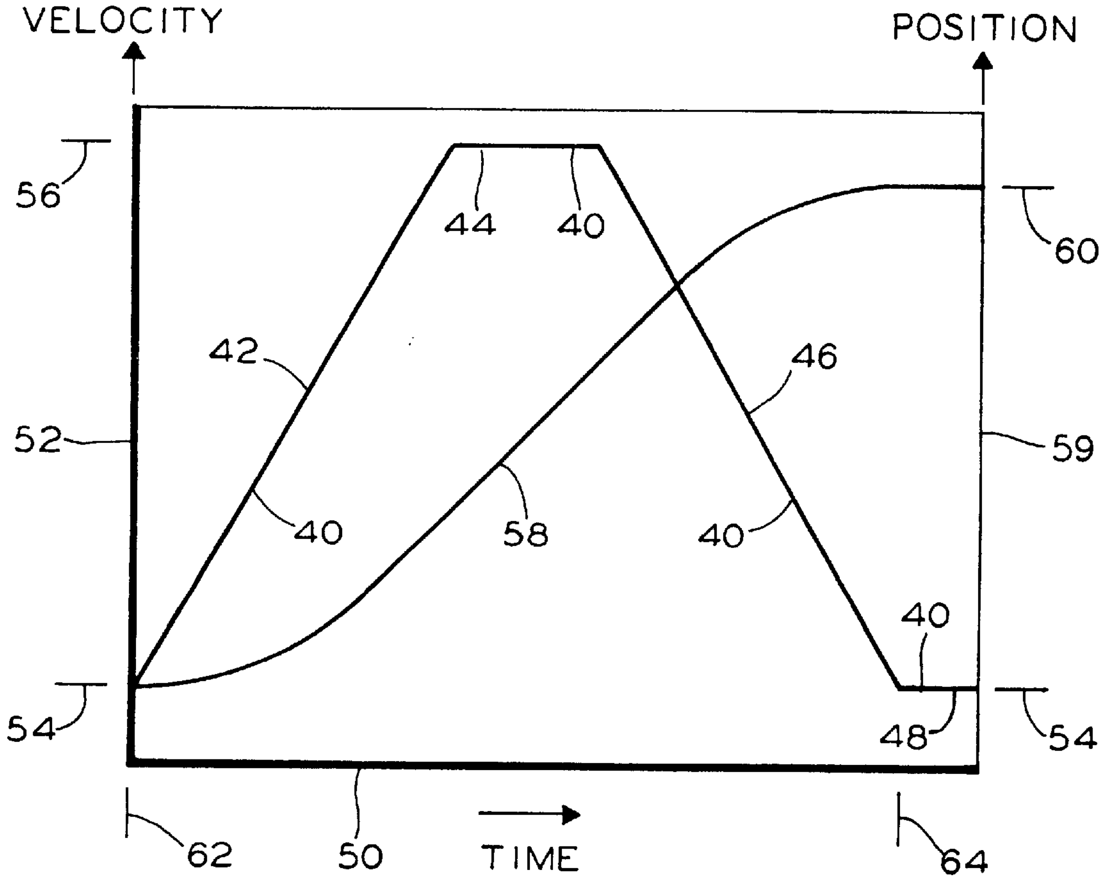
FIG. 2 is a plot showing ideal profiles for door velocity and distance traveled versus time.

Reference is now made to FIG. 2 which shows plots of velocity and position of the door during a stroke of the door. The stroke may be an opening stoke of the door, a closing stroke, or a stroke from a closed position to a slightly opened position which is used to release a portion of a person, or a garment, which has been caught by the closing door.

FIG. 2 has time axis 50 showing the time 62 at which the stroke begins and the time 64 at which the stroke ends. The velocity 40, which is plotted along velocity axis 52, begins at zero velocity 54 and increases at a uniform acceleration on segment 42 until a maximum velocity 56 is reached. Segment 44 is continued at velocity 56. In segment 46, the velocity decreases with a uniform deceleration until zero speed 54 is reached at time 64.

The reason for preferring uniform acceleration and deceleration on segments 42 and 46 is to move the doors as quickly as possible, subject to limitations due to the strength of the door drive hardware. The maximum velocity on segment 44 may be imposed for safety reasons.

FIG. 2 also shows the position 58 of the door during the stroke. Position 58 is shown on position axis 59. The position axis 59 has the same zero 54 as the velocity axis 52. During the stroke, the door moves from the zero position 54 to the maximum distance 60, which corresponds to the position of the door after the stroke is completed.

Figure 3:
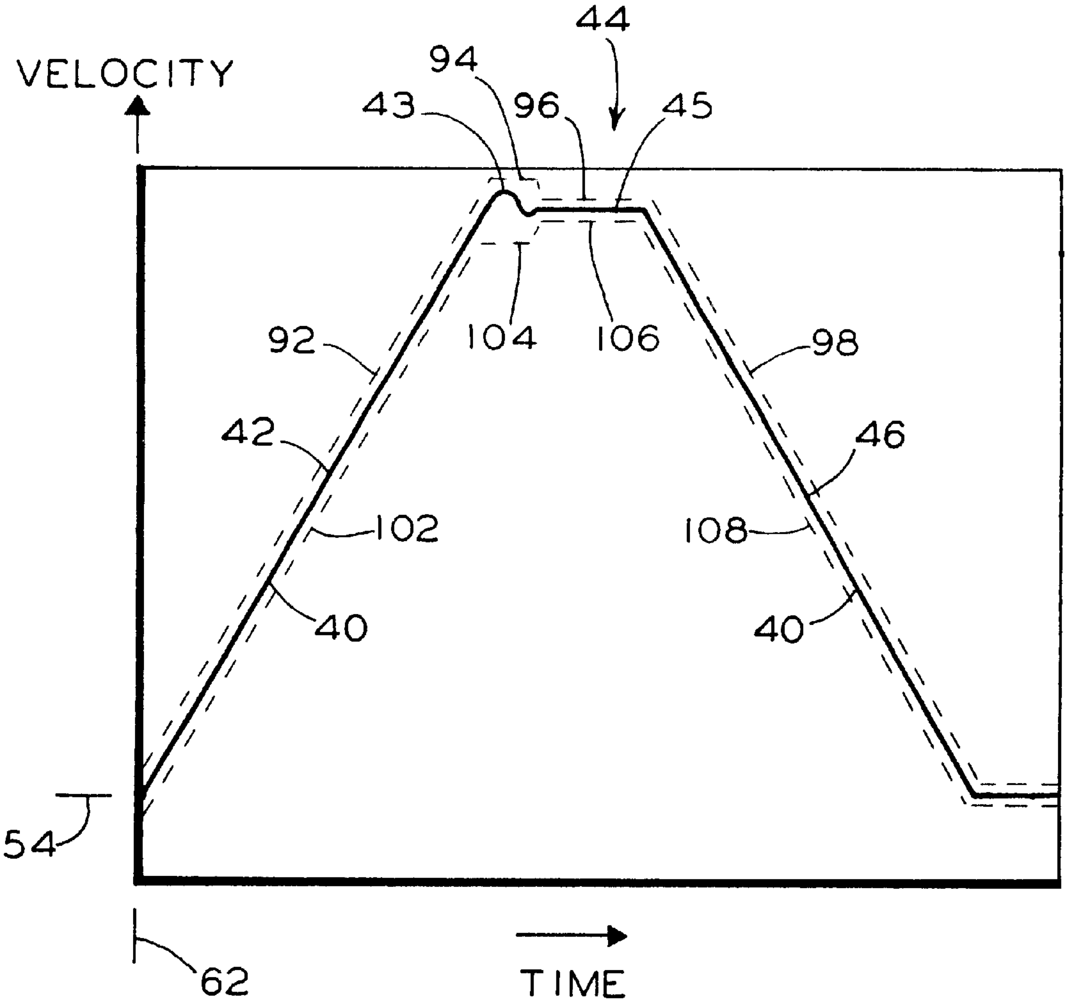
FIG. 3 is a plot showing allowable envelopes for the door velocity for various segments of the stroke.

Refer now to FIG. 3 in which a stroke having an acceleration segment 42, a slight overshoot segment 43, a stabilized segment 45, a deceleration segment 46 and a stopped segment 48 is illustrated. Segments 43 and 45 show enhanced detail of the constant velocity segment 44.

For each complete trajectory, the CPU 12 sends to the DSP 16 one or more signals defining the acceleration to be followed on acceleration segment 42, a maximum velocity to be maintained on stabilized segment 45 and the distance to be traveled.

Optionally, it may also send signal(s) defining a deceleration value to the DSP 16 if the deceleration is to differ from the acceleration. Preferably, it also sends signal(s) indicating constants for a proportional integral derivative filter.

Preferably, it also sends maximum allowed error discrepancy signal(s) indicating the value to trigger an obstruction for that segment. For the acceleration segment 42, at least one error envelope value is transmitted indicating the levels 102 and 92. For the overshoot segment 43, the CPU 12 sends at least one error envelope value defining the range between 94 and 104. For the stabilized segment 45, the CPU 12 sends error envelope value(s) defining the error envelopes 96 and 106. For the deceleration portion 46, the CPU 12 sends error envelope values defining the error envelopes 98 and 108.

Once the CPU 12 has sent the DSP 16 signals indicative of the door trajectory for the stroke and signals indicative of the error envelope to use on the first signal, the door would continue to execute the stroke under the control of the DSP 16 even if the CPU crashed. Also, if the door encountered an obstruction the dynamic brake would be applied.

It is presently preferred that when the central processor unit 12 sends the information defining the stroke to the DSP 16, it also sends a breakpoint distance. When that breakpoint distance is reached, the DSP 16 reports back to the CPU 12 that it has reached that point. The CPU 12 may, at that time, send revised error envelope signal(s) to the DSP 16, to be used on the next segment.

Performing this way, the CPU 12 is mostly waiting for the DSP 16 to complete each segment allowing the CPU 12 to perform other tasks.

Figure 4:
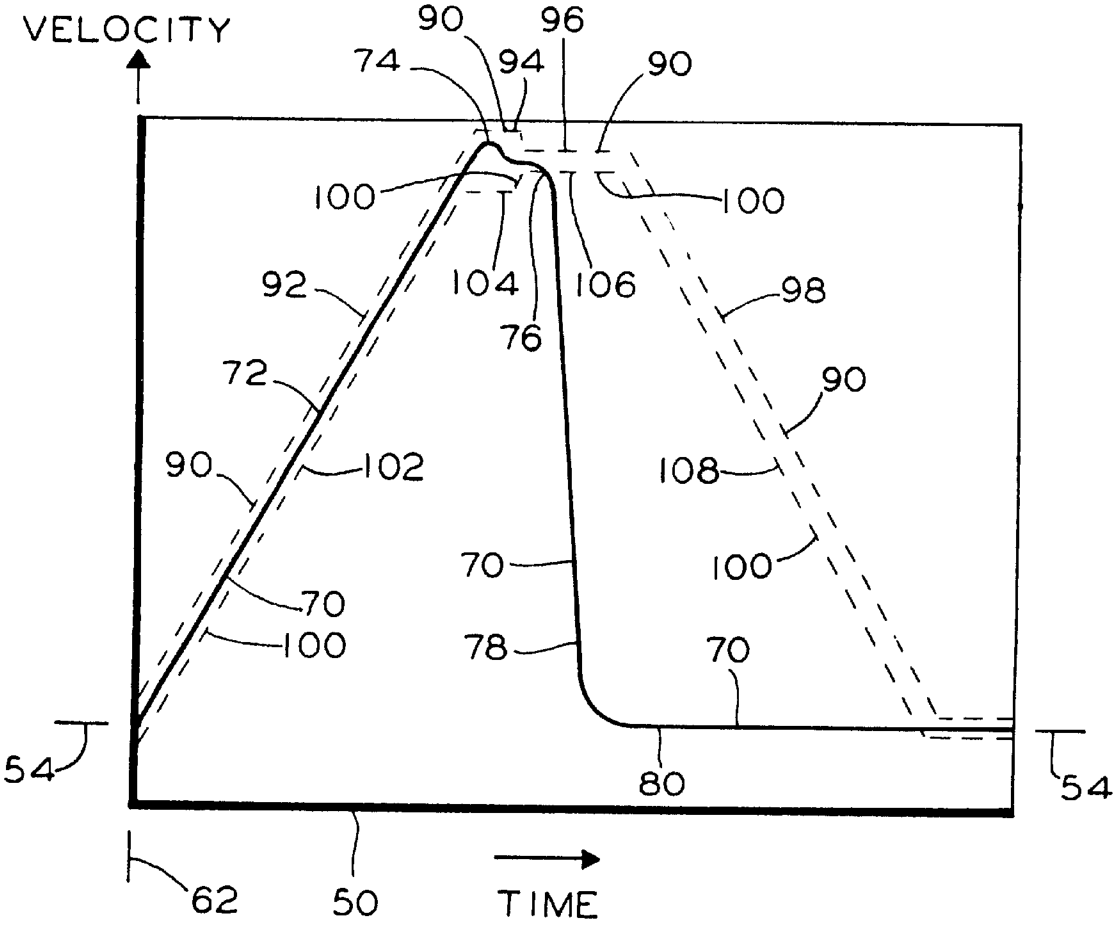
FIG. 4 is a plot showing departure from the envelope when an obstruction is detected.

FIG. 4 is a plot illustrating an event in which an obstruction is encountered. The trajectory profile 70 remains within both the upper velocity limit 92 and the lower velocity limit 102 during the acceleration portion 72. During the overshoot segment 74, the trajectory remains between the upper velocity limit 94 and such lower velocity limit 104. During the next segment, the velocity 70 drops below lower envelope 106 which indicates that an obstruction has been encountered. This then triggers the dynamic braking of the door that stops it quickly on portion 78.

It should be noted that, preferably, all of the velocities and velocity limits processed in the DSP 16 are processed as distance per time interval and, more precisely, they are processed as encoder pulses per time interval.

Figure 5:
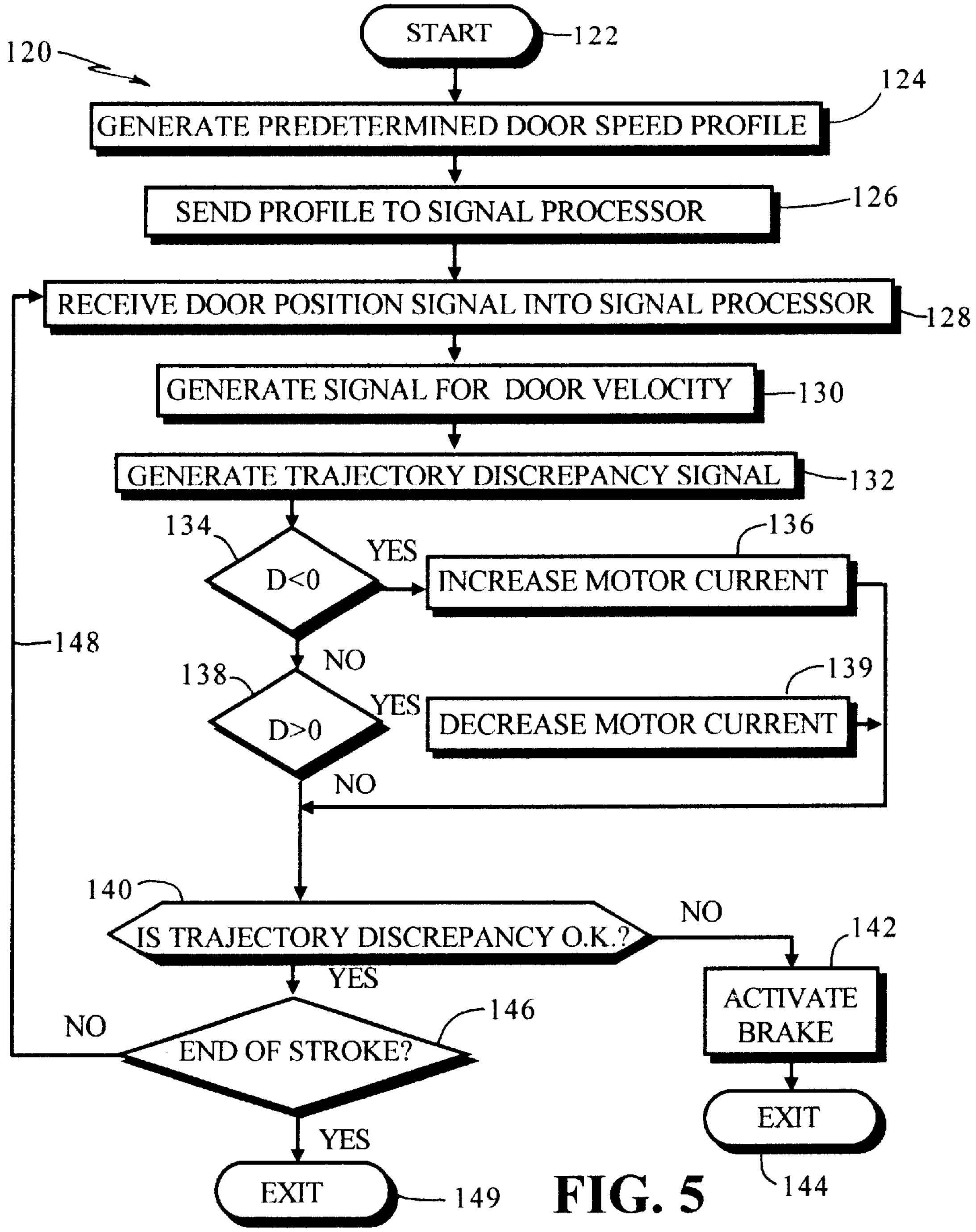
FIG. 5 is a flowchart of the process of detecting obstructions during a stroke of the door based on a velocity discrepancy of the door.

FIG. 5 is a flowchart illustrating a method, generally designated 120, for detecting obstructions according to the present invention. Processing starts at step 122 when a command for a door stroke is received in CPU 12. At step 124, the CPU 12 generates a predetermined door trajectory profile. The trajectory profile may represent speed versus time, distance traversed per time interval, or encoder counts per time interval. At step 126 signals that are indicative of the profile are sent by connection 14 to the signal processor which, preferably, is such DSP 16.

At step 128, a door position signal is received into DSP 16 from position encoder 28. At step 130, a signal indicative of the door velocity is generated in the DSP 16, based on the signal indicative of door position from encoder 28. The signal indicative of such door velocity may, for example, consist of encoder counts per time interval.

At step 132, a trajectory discrepancy signal is generated. At step 134 if the discrepancy is negative, logic proceeds to step 136 where motor current is increased. Otherwise, such logic proceeds to step 138. If the discrepancy is positive, the logic proceeds to step 139 where the motor current is decreased. The velocity is then tested in step 140. If it is not within acceptable limits, the logic proceeds to step 142 where the brake is activated and the stroke terminates at step 144.

If the velocity is within the acceptable limits, then at step 146 a determination is made as to whether the stroke has been completed. If it is not completed, control returns on logical path 148 to step 128 and the process iterates. If the stroke terminates at step 146, processing exits at step 149.

Figure 6:
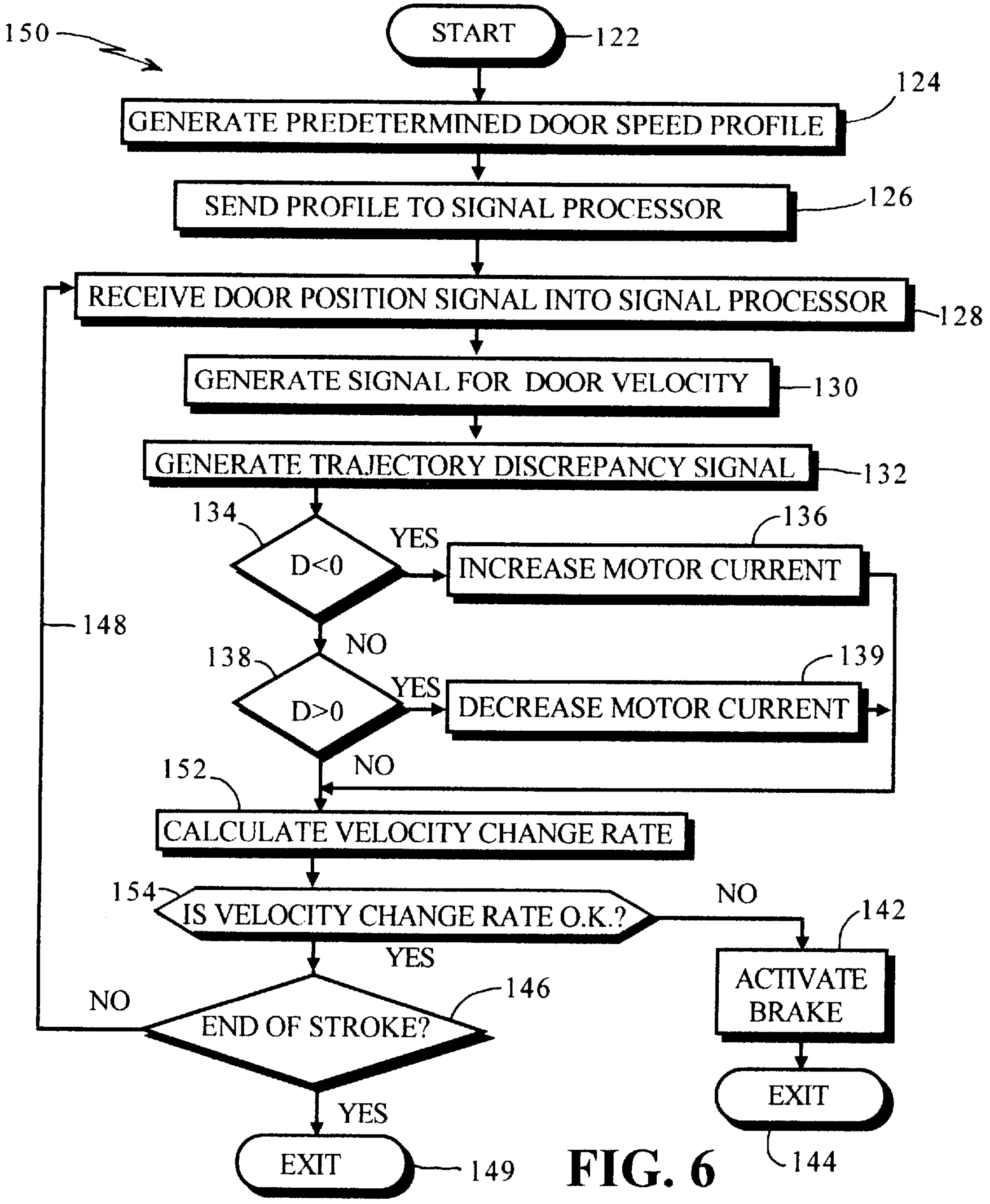
FIG. 6 is a flowchart of the process of detecting obstructions during a stroke of the door based on a rate of change of velocity with time.

FIG. 6 illustrates an alternative method, generally designated 150, for detecting obstructions. As in method 120, processing begins at step 122 and proceeds to steps 134 and 138. Then, one or more signals indicating the time rate of change of the door velocity are calculated in step 152. This signal, for example, may be a time rate of change of the number of encoder pulses per time interval. These signals are tested in step 154. If the time rate of change of door velocity is excessive, control passes to step 142 to apply the brake and exit at step 144. If the time rate of change of door velocity is acceptable, control passes to step 146, as in method 120, the logic proceeds by logical path 148 to step 128 and the process iterates.

Figure 7:
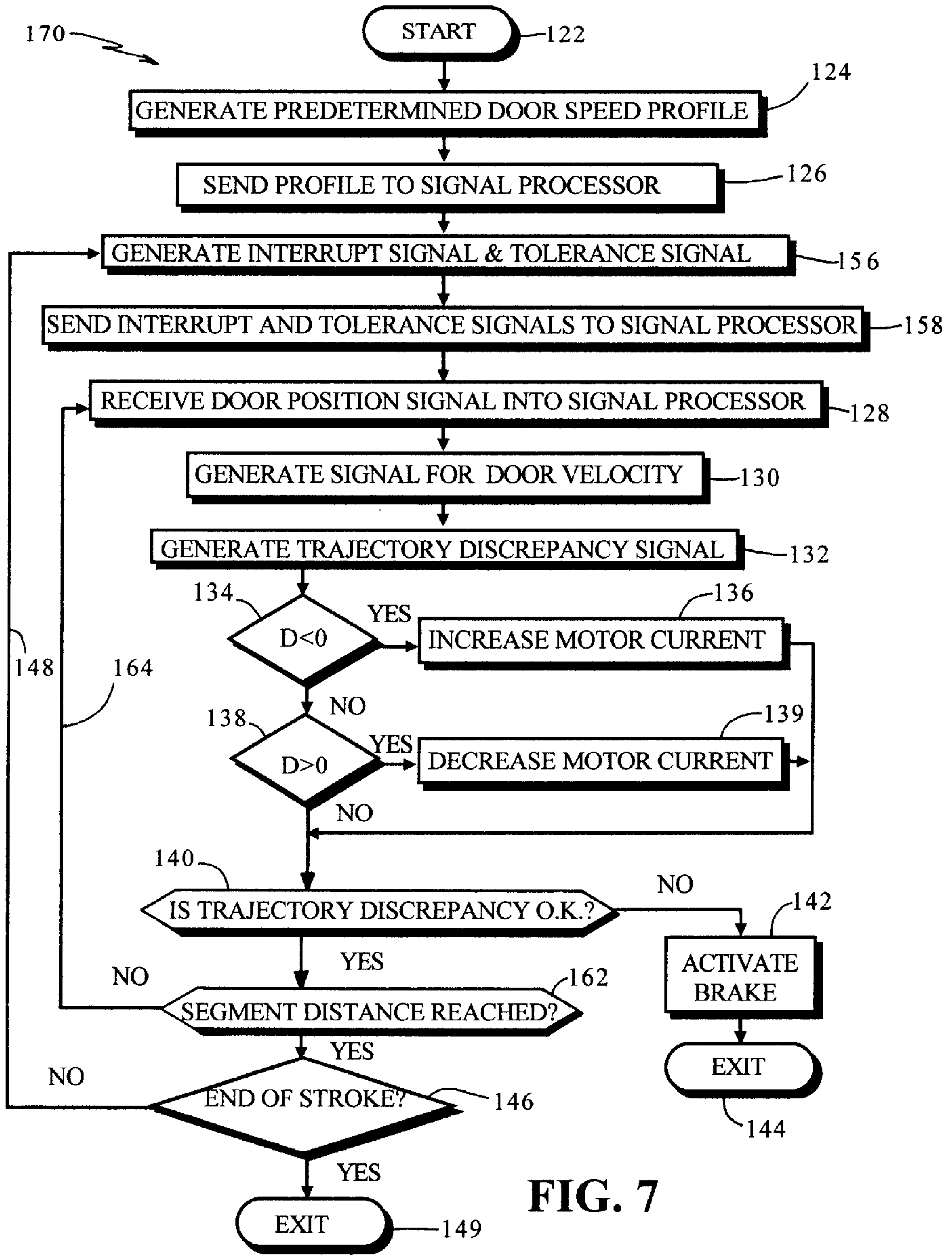
FIG. 7 is a flowchart of the presently preferred method of the invention in which different tolerances are permitted in different portions of the stroke.

FIG. 7 shows the method, generally designated 170, of the presently preferred embodiment of the invention. In this preferred embodiment, when the CPU 12 determines that a stroke is required, the control passes to entry point 122 of method 170. In step 124, a predetermined door trajectory profile is generated and in step 126 it is sent to the signal processor, preferably, DSP 16.

An interrupt signal indicative of at least one of the segments 42, 43, 45, or 46 is generated to the CPU 12. Likewise, tolerance signals which are indicative of the lower velocity limits 102, 104, 106 or 108 are generated, as well as tolerance signals indicative of upper velocity limits 92, 94, 96, or 98 are generated.

The break-point interrupt signal (that defines the limits of each segment) and the tolerance signal(s) are sent to the DSP 16 at step 158 in method 170. The following steps 128, etc., through step 140 are similar to those in method 120. Then, at step 162, a test is made based on the encoder signal to determine whether the segment 42, 43, 45, 46 or 48 is completed. If it is not completed, control returns by logical path 164 to step 128. If the segment is completed, control proceeds to step 146 where, as in method 120, a test is made at step 146 to determine whether the stroke is completed.

Figure 8:
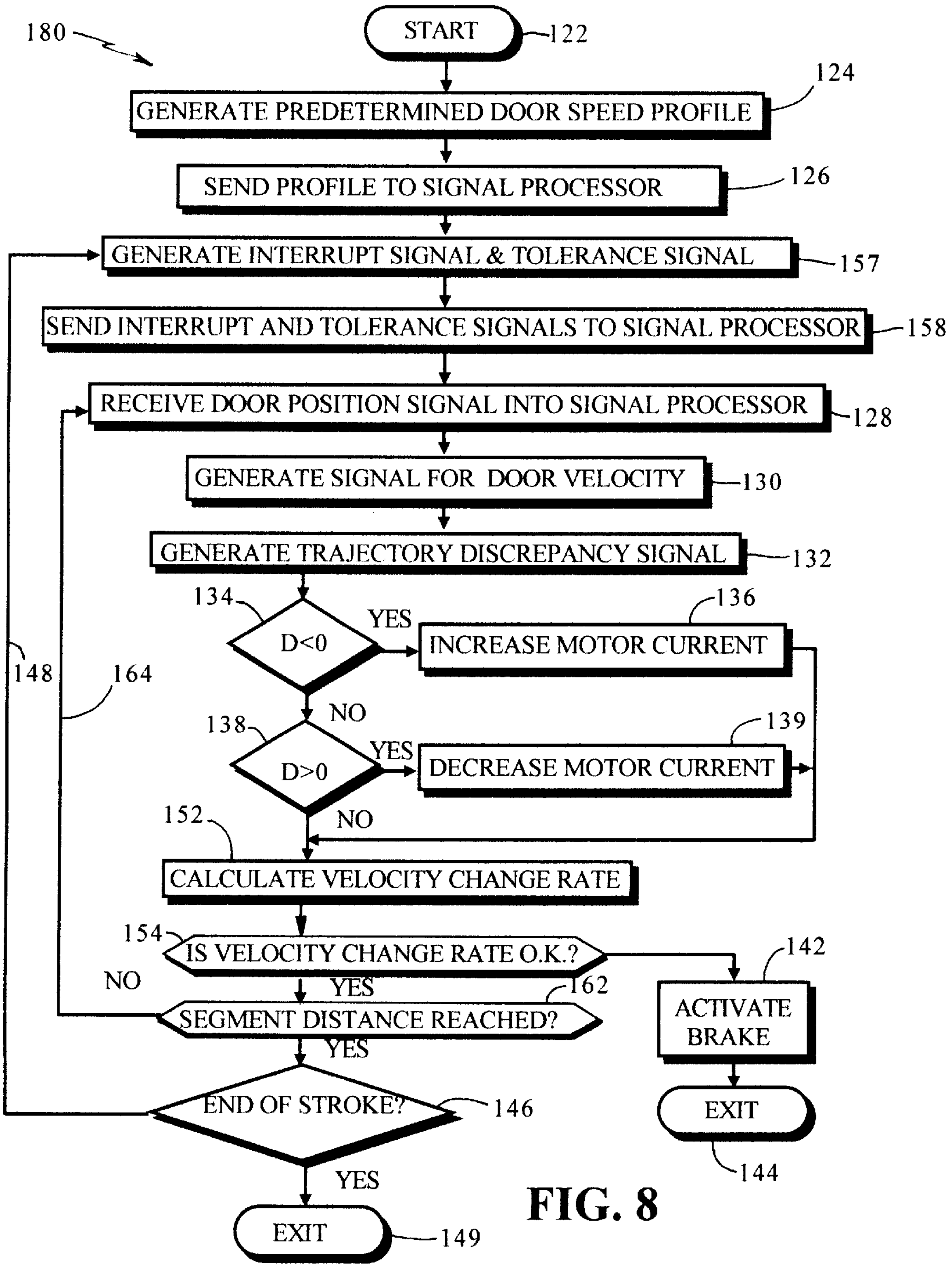
FIG. 8 is a flowchart of a method of detecting obstructions during a stroke of the door based on a rate of change of velocity with time which permits different tolerances in different portions of the stroke.

FIG. 8 is a flowchart showing the method, generally designated 180, of an alternative embodiment of the invention. Control begins at step 122. At step 156, break-point interrupts and tolerance signals are generated. The tolerance signal, generated in step 156, is a limit on maximum allowed rate of change of velocity with time. At step 158 these signals are sent to the DSP 16. Processing continues as in method 170 until after steps 134 and 138. At step 152, one or more signals are generated indicative of the rate of change of velocity with time. At step 154 a determination is made whether the velocity change rate is within the tolerance calculated in step 157.

If the velocity change rate is not within the tolerance, processing passes to step 142, where the brake is applied, and processing terminates at step 144. If the velocity change rate is within the tolerance, processing proceeds to step 162 as in method 170.

In the presently preferred embodiment of the invention, the signal processor 16 is a motion control chip performing more than two thousand door position verifications per second (typically three to four thousand) based upon the feedback signal from the encoder 28. It is the lack of an obstruction signal in each sample period that allows the motor 24 to advance to the next sample position. If during any one sample period the encoder 28 feedback does not match a trajectory profile sent from the CPU 12 to the DSP 16, the dynamic brake will be applied unconditionally and the door will stop immediately.

The invention was conceived so that it is nearly impossible to disable this function within the hardware, thus, guaranteeing that the unit cannot operate with an invisible fault or with faulty obstruction detection circuits (fail-safe) as would be the case with other systems that makes use of motor current feedback. However, the system can be programmed to allow more or less variation (error) in the signal from encoder 28 before an obstruction is triggered, thus, modifying the perceived force intensity the door is applying against the obstruction.

From this mode of operation the invention has the ability to detect an obstruction far faster then any prior art door operator. It is this speed of detection coupled with the very rapid dynamic brake operation that actually limits the amount of impact energy that is transferred to a passenger being hit by the door. In its presently preferred embodiment, the invention employs an LM 629 motion control processor.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit of the invention or the scope of the appended claims.

I claim:

1. A method of detecting obstructions encountered by a motorized door, said method comprising the steps of:

(a) generating, in a central processor for said door, at least one signal indicative of a predetermined door trajectory profile for a stroke of said door, said door trajectory profile providing at least one of an ideal speed and an ideal position versus an elapsed time since a beginning of at least a segment of said stroke;

(b) communicating to a motion control processor at least one signal indicative of said door trajectory profile;

(c) communicating a door position signal indicative of a position of said door from a position encoder for said door to said motion control processor;

(d) generating at least one signal indicative of at least one of a velocity of said door and a position of said door from said door position signal;

(e) generating, in said motion control processor, a trajectory discrepancy signal indicative of at least one of a velocity discrepancy and a position discrepancy between at least one of said velocity and said position of said door and at least one of said ideal speed and said ideal position for said predetermined door trajectory profile;

(f) generating at least one motor control signal based on said trajectory discrepancy signal, said at least one motor control signal for communication to a power amplifier connected to a motor for said door;

(g) performing at least one test on at least one of said trajectory discrepancy signal, said velocity of said door and said position of said door to determine whether said door has encountered an obstruction;

(h) generating an obstruction detection signal when said at least one test has determined that said door has encountered and obstruction, said obstruction detection signal for stopping said door;

(i) generating, in said central processor, a breakpoint position signal indicative of a segment distance to be traveled during said segment of said stroke;

(j) communicating said breakpoint position signal to said motion control processor;

(k) generating, in said central processor, an allowable discrepancy signal indicative of a predetermined value for said trajectory discrepancy;

(l) communicating said allowable discrepancy signal to said motion control processor;

(m) generating, in said motion control processor, said obstruction detection signal when said trajectory discrepancy exceeds said predetermined value for said trajectory discrepancy;

(n) generating in said motion control processor an interrupt to signal said central processor that a breakpoint has occurred requiring a revised allowable discrepancy signal for a subsequent segment of said stroke, when a distance traveled by said door corresponds to said segment distance; and (o) communicating said revised allowable discrepancy signal from said central processor to said motion control processor.

2. A method, according to claim 1, wherein said at least one test includes the step of comparing said trajectory discrepancy with a predetermined allowable discrepancy and generating said obstruction detection signal when said trajectory discrepancy exceeds said predetermined allowable discrepancy.

3. A method, according to claim 1, wherein said at least one test includes the step of determining a rate of change with time of said velocity of said door and comparing said rate of change with time with a predetermined rate amount and generating said obstruction detection signal when said rate of change with time of said velocity exceeds said predetermined rate amount.

4. A method, according to claim 1, wherein said method includes the additional steps of:

(i) generating, in said central processor, a breakpoint position signal indicative of a segment distance to be traveled during said segment of said stroke;

(ii) communicating said breakpoint signal to said motion control processor;

(iii) generating, in said central processor, an allowable acceleration signal indicative of a predetermined allowable rate of change with time of said velocity;

(iv) communicating said allowable acceleration signal to said motion control processor;

(v) generating, in said motion control processor, a velocity rate signal indicative of a rate of change with time of said velocity;

(vi) generating, in said motion control processor, said obstruction detection signal when said rate of change with time of said velocity exceeds said predetermined allowable rate of change with time of said velocity;

(vii) communicating to said central processor an interrupt signal requiring a revised allowable acceleration signal indicative of a revised rate of change with time of said velocity for a subsequent segment of said stroke, when a distance traveled by said door corresponds to said segment distance; and (viii) communicating said revised allowable acceleration signal to said motion control processor.

5. A method, according to claim 1, wherein said segment of said stroke is an acceleration segment and wherein said ideal speed is increasing.

6. A method, according to claim 1, wherein said segment of said stroke is a constant speed segment and wherein said ideal speed remains substantially constant.

7. A method, according to claim 1, wherein said segment of said stroke is a deceleration segment and wherein said ideal speed is decreasing.

8. A method, according to claim 1, wherein said at least a segment of a stroke of said door is a complete closing stroke of said door.

9. A method, according to claim 1, wherein said at least a segment of a stroke of said door is a complete opening stroke of said door.

10. A method, according to claim 1, wherein said at least a segment of a stroke of said door is a partial opening stroke of said door which opens said door sufficiently for a trapped object to be released.

11. An apparatus for detecting obstructions encountered by a motorized door, said apparatus comprising:

(a) means disposed in a central processor for such door for generating at least one signal indicative of a predetermined door trajectory profile for at least a segment of a stroke of such door, said predetermined door trajectory profile providing at least one of an ideal speed and an ideal position versus an elapsed time since a beginning of said segment of said stroke;

(b) a motion control processor connected to receive said at least one signal indicative of said predetermined door trajectory profile;

(c) means connected to said motion control processor for communicating a door position signal from a position encoder for such door;

(d) means disposed in said motion control processor for generating at least one signal indicative of at least one of a velocity and a position of such door from said door position signal;

(e) means disposed in said motion control processor for generating a trajectory discrepancy signal indicative of at least one of a velocity discrepancy and a position discrepancy between at least one of said velocity and said position of such door and at least one of said ideal speed and said ideal position for said predetermined door trajectory profile;

(f) means disposed in said motion control processor for generating a motor control signal based on said velocity and/or position discrepancy signal, said motor control signal for communication to a power amplifier connected to a motor for such door;

(g) means disposed in said motion control processor for performing at least one test on at least one of said trajectory discrepancy signal, said velocity of such door and said position of such door to determine whether such door has encountered an obstruction;

(h) means disposed in said motion control processor for generating an obstruction detection signal when said at least one test has determined that such door has encountered an obstruction, said obstruction detection signal for stopping such door;

(i) means disposed in said central processor for generating a breakpoint position signal indicative of a segment distance to be traveled during said segment of said stroke;

(j) means connected to said central processor for communicating said breakpoint position signal to said motion control processor;

(k) means disposed in said central processor for generating an allowable discrepancy signal indicative of a predetermined value for said trajectory discrepancy;

(l) means connected to said central processor for communicating said allowable discrepancy signal to said motion control processor;

(m) means disposed in said motion control processor for generating said obstruction detection signal when said trajectory discrepancy exceeds said predetermined value for said trajectory discrepancy;

(n) means disposed in said motion control processor for generating an interrupt signal indicating that said segment distance has been reached;

(o) means connected to said central processor for communicating said interrupt signal to said central processor;

(p) means disposed in said central processor for generating a revised allowable discrepancy signal; and (q) means connected to said motion control processor for communicating said revised allowable discrepancy signal to said motion control processor said revised allowable discrepancy signal being for a subsequent segment of said stroke.

12. An apparatus, according to claim 11, wherein said means for performing said at least one test includes means for comparing said trajectory discrepancy with a predetermined allowable discrepancy and generating said obstruction detection signal when said trajectory discrepancy exceeds said predetermined allowable discrepancy.

13. An apparatus, according to claim 11, wherein said means for performing said at least one test includes a means for determining a rate of change with time of said velocity of such door and means for comparing said rate of change with time with a predetermined rate amount and generating said obstruction detection signal when said rate of change with time of said velocity exceeds said predetermined rate amount.

14. An apparatus, according to claim 11, wherein said apparatus further includes:

(i) means disposed in said central processor for generating a breakpoint signal indicative of a segment distance to be traveled during said segment of said stroke;

(ii) means connected to said central processor for communicating said breakpoint signal to said motion control processor;

(iii) means disposed in said central processor for generating an allowable acceleration signal indicative of a predetermined allowable rate of change with time of said velocity;

(iv) means connected to said central processor for communicating said allowable acceleration signal to said motion control processor;

(v) means disposed in said motion control processor for generating a velocity rate signal indicative of a rate of change with time of said velocity;

(vi) means disposed in said motion control processor for generating said obstruction detection signal when said rate of change with time of said velocity exceeds said predetermined allowable rate of change with time of such velocity;

(vii) means disposed in said motion control processor for generating an interrupt signal indicating that said segment distance has been reached;

(viii) means connected to said central processor for communicating said interrupt signal to said central processor;

(ix) means disposed in said central processor for generating a revised allowable acceleration signal; and (x) means connected to said motion control processor for communicating said revised allowable acceleration signal to said motion control processor, said revised allowable acceleration signal being for a subsequent segment of said stroke.

* * * * *